(12) United States Patent
Albrecht et al.

(10) Patent No.: US 7,046,476 B1
(45) Date of Patent: May 16, 2006

(54) METHOD APPARATUS AND SYSTEM FOR ACCESSING DISCONTINUOUS MEDIA TRACKS

(75) Inventors: Thomas Robert Albrecht, San Jose, CA (US); Henry Hung Yang, San Jose, CA (US)

(73) Assignee: Hitachi Global Storage Technologies, Amsterdam (NL)

( * ) Notice: Subject to any disclaimer, the term of this patent is extended or adjusted under 35 U.S.C. 154(b) by 0 days.

(21) Appl. No.: 11/032,355

(22) Filed: Jan. 10, 2005

(51) Int. Cl.
*G11B 5/596* (2006.01)
(52) U.S. Cl. .................................. 360/77.02
(58) Field of Classification Search ............ 360/77.02, 360/69, 77.05, 77.04, 77.06, 51, 63, 76, 75; 369/47.29; 714/8; 385/3; 428/811.3
See application file for complete search history.

(56) References Cited

U.S. PATENT DOCUMENTS

| | | | | |
|---|---|---|---|---|
| 4,737,867 A | * | 4/1988 | Ishikawa et al. ............... 360/69 |
| 5,184,257 A | * | 2/1993 | Koga et al. ............... 360/77.05 |
| 5,384,671 A | * | 1/1995 | Fisher ......................... 360/51 |
| 5,477,402 A | | 12/1995 | Elliott et al. ............. 360/77.08 |
| 5,793,559 A | | 8/1998 | Shepherd et al. ........ 360/78.09 |
| 5,808,995 A | * | 9/1998 | Nakamura et al. ....... 369/47.29 |
| 5,926,337 A | * | 7/1999 | Itou et al. ................. 360/77.04 |
| 6,072,651 A | * | 6/2000 | Kato et al. ..................... 360/63 |
| 6,115,203 A | | 9/2000 | Ho et al. .................. 360/77.04 |
| 6,146,776 A | * | 11/2000 | Fukuzawa et al. ........ 428/811.3 |
| 6,292,320 B1 | * | 9/2001 | Mason et al. ................... 360/63 |
| 6,421,195 B1 | | 7/2002 | Rubin et al. ................... 360/48 |
| 6,449,116 B1 | | 9/2002 | Morris et al. ............ 360/77.04 |
| 6,500,497 B1 | | 12/2002 | Wang et al. ................. 427/528 |
| 6,519,107 B1 | * | 2/2003 | Ehrlich et al. ................. 360/75 |
| 6,611,388 B1 | | 8/2003 | Miyata et al. ................. 360/17 |
| 6,631,046 B1 | * | 10/2003 | Szita et al. .................... 360/75 |
| 6,643,082 B1 | | 11/2003 | Belser .......................... 360/48 |

(Continued)

FOREIGN PATENT DOCUMENTS

JP           200339670           12/2000

OTHER PUBLICATIONS

"Must You Interleave Me?", from Norton Disk Explorer, 1990, pp. 25-27.

(Continued)

*Primary Examiner*—David Hudspeth
*Assistant Examiner*—Fred F. Tzeng
(74) *Attorney, Agent, or Firm*—Kunzler & Associates

(57) ABSTRACT

An apparatus, system, and method are disclosed for accessing discontinuous media tracks. The apparatus, in one embodiment, accesses discontinuous media tracks of a storage medium having one or more independently formed storage regions thereon. Each storage region may include a set of track segments. A memory may be provided to store track offset information for each storage region. A mapping module may collect track offset information, calculate a physical offset between adjacent storage regions, define a track, create a table, and store the track offset information in the memory. The apparatus may further include a tracking module to sense a position of a head relative to a centerline of a track segment within a current storage region, access offset information, and align a storage head with a closely aligned track segment within a subsequent storage region. Consequently, discontinuous media tracks may be accessed by a storage access device.

30 Claims, 5 Drawing Sheets

U.S. PATENT DOCUMENTS

| | | |
|---|---|---|
| 6,657,810 B1 | 12/2003 | Kupferman .............. 360/77.04 |
| 6,714,373 B1 * | 3/2004 | Sasaki ........................ 360/63 |
| 6,728,899 B1 * | 4/2004 | Ng et al. ...................... 714/8 |
| 6,744,583 B1 | 6/2004 | Ikeda et al. ................. 360/59 |
| 6,754,030 B1 * | 6/2004 | Seng et al. .................. 360/76 |
| 6,754,032 B1 | 6/2004 | Szita et al. ............. 360/77.08 |
| 6,781,785 B1 | 8/2004 | Belser et al. ............ 360/77.03 |
| 6,785,078 B1 * | 8/2004 | Basham et al. .............. 360/69 |
| 6,795,594 B1 * | 9/2004 | Betty ........................... 385/3 |
| 6,873,488 B1 * | 3/2005 | Teo et al. ................ 360/77.06 |
| 2003/0039052 A1 | 2/2003 | Adams et al. ............... 360/75 |
| 2003/0112539 A1 | 6/2003 | Shu ............................. 360/48 |

OTHER PUBLICATIONS

Ho Seong Lee, "Implementation of Adaptive Feedforward Cancellation Algorithms for Pre-Embossed Rigid Magnetic (PERM) Disks", IEEE Transactions on Magnetics, vol. 33, No. 3, May 1997.

Shoji Tanaka et al., "Characterization of Magnetizing Process for Pre-Embossed Servo Pattern of Plastic Hard Disks", IEEE Transactions on Magnetics, vol. 30, No. 6, Nov. 1994.

Kenjiro Watanabe et al., "Demonstration of Track Following Technique Based on Discrete Track Media", IEEE Transactions on Magnetics, vol. 29, No. 6, Nov. 1993.

* cited by examiner

300

| Region 1 | Region 2 | Region 3 | ... | Region n |
|---|---|---|---|---|
| Track Seg 1<br>Offset = +.14 | Track Seg 1<br>Offset = -.26 | Track Seg 1<br>Offset = -.03 | ... | Track Seg 1<br>Offset = +.25 |
| Track Seg 2<br>Offset = +.15 | Track Seg 2<br>Offset = -.26 | Track Seg 2<br>Offset = -.03 | ... | Track Seg 2<br>Offset = +.24 |
| Track Seg 3<br>Offset = +.15 | Track Seg 3<br>Offset = -.26 | Track Seg 3<br>Offset = -.04 | | Track Seg 3<br>Offset = +.25 |
| Track Seg 4<br>Offset = +.16 | Track Seg 4<br>Offset = -.25 | Track Seg 4<br>Offset = -.05 | ... | Track Seg 4<br>Offset = +.24 |
| ⋮ | ⋮ | ⋮ | | ⋮ |
| Track Seg n<br>Offset = +.16 | Track Seg n<br>Offset = -.25 | Track Seg n<br>Offset = -.05 | ... | Track Seg n<br>Offset = +.25 |

Fig. 3

METHOD APPARATUS AND SYSTEM FOR ACCESSING DISCONTINUOUS MEDIA TRACKS

BACKGROUND OF THE INVENTION

1. Field of the Invention

This invention relates to storage media and more particularly relates to accessing discontinuous media tracks on a storage medium.

2. Description of the Related Art

Traditionally, the storage capacity and the areal density of magnetic storage media, such as disks used within disk drives, have been limited by certain restraints such as material characteristics, manufacturing processes, metrological limitations, mechanical capabilities, and the like. For example, conventional multigrain magnetic media is generally created by covering a flat substrate with a thin layer of magnetic alloy that forms random clusters of magnetically charged grains on the substrate surface.

The conventional process of creating media storage has been limited by several physical constraints, including a natural occurrence called the superparamagnetic effect, i.e. the fluctuation of magnetization due to thermal agitation. The superparamagnetic effect influences a storage medium when bit cells of magnetically charged grain clusters, are defined by grains so small that magnetization becomes unstable. In such circumstances, fluctuation of magnetization can cause erasure of data. Consequently, the areal density of thermally stable storage media has typically been restricted to around 150 Gbit/in$^2$ with conventional multigrain magnetic media.

Recently, however, patterned media comprising an ordered array of highly uniform islands has been developed as an alternative to circumvent some of the limitations traditionally associated with magnetic media. Independent magnetic islands corresponding to bits or track segments that are thermally stable can be formed on the surface of the storage media. Each island of the patterned media may be capable of storing one or more bits. As a result of the magnetic isolation provided by the islands, storage media can be created with greater areal densities and storage capacities than possible with conventional multigrain magnetic media technology.

Patterned media can be formed by a variety of methods known to those skilled in the art. One proposed method to create patterned media is nanoimprint lithography or nanoimprint replication. In this method, a stamper, or a master template, may be formed having a nm-scale pattern. The stamper may subsequently be used to stamp, or create, formed patterns on the surface of a substrate at a relatively low cost compared to other methods for patterning. The formed patterns may be covered with a magnetic layer to form independent magnetic domains.

One method suitable for creating a patterned stamper, either directly or indirectly, uses e-beam lithography. E-beam lithography, in certain embodiments, can be used to create islands having dimensions around the scale of about 25 nm or less, corresponding to areal densities of about 300 Gbit/in$^2$ or greater. These high resolution patterns are beyond the dimensions achievable using optical lithography, a technique commonly used in the electronics industry to make integrated circuits. E-beam exposure tools may be similar to those used to create masks for optical lithography; however, generating patterns for patterned media generally requires a higher resolution e-beam exposure system than is needed for conventional e-beam mask generation.

Patterned media, which overcomes some of the traditional challenges associated with magnetic media, can beneficially provide storage media with greater areal densities and storage capacities. However, the mass production of patterned media presents some challenges that have hindered patterned media from becoming readily available in the market.

First, because predefined patterns are typically formed into the substrate of a storage medium or disk, tracks and bit alignment is fixed during fabrication instead of during a servowriting process as is commonly done with conventional magnetic media. Consequently, storage devices and read/write mechanisms must be able to follow preformed tracks and compensate for errors, such as centering errors, shape irregularities, or the like. Ideally, a servo system would able to function efficiently despite misaligned features within the patterned media. However, due to the high flying speeds and small features associated with reading and writing data, currently available servo systems are able to adjust to only minor variations within the patterned media.

Second, creating patterns for master templates by writing high resolution patterns using e-beam lithography can be prohibitively time-consuming. Typically, e-beam lithography tools operating at their best resolution are using the smallest beam diameter and a very limited current. Depending on the detail of the pattern, the beam current available, the sensitivity of a selected resist, and the time associated with mechanical motion of the stage, the total write time required to create a pattern for a whole disk surface may take months to years to complete, depending on the size of the pattern. Larger patterns require greater amounts of time for completion. Drawn out write times may be unacceptable, considering the associated cost and the delicacy of the e-beam writing system. In certain instances, the e-beam may fail long before the completion of the e-beam writing process.

A contemplated solution to reduce the size of e-beam written patterns is to create a small section of a pattern using e-beam lithography, and then to replicate the section using other methods. Media patterns tend to be periodic, and repeated patterned sections do not pose serious problems. However, forming multiple sections on the surface of a storage medium presents several physical limitations that affect the continuity of individual data tracks around the disk. Due to the scale of the pattern features, perfect alignment of track segments from individual sections is nearly impossible and would require extremely sensitive manufacturing environments that for the foreseeable future appears to be too costly for practical use. Furthermore, misaligned media tracks from a more cost-effective production environment may disrupt a servo system when transitioning between patterned sections.

From the foregoing discussion, it should be apparent that a need exists for a method, apparatus, and system for accessing discontinuous media tracks created in a cost-effective production environment. Beneficially, such an apparatus, system, and method would enable storage media to maximize the areal density and storage capacity of a given storage area and would enable economical and efficient implementation of high resolution patterned media.

SUMMARY OF THE INVENTION

The present invention has been developed in response to the present state of the art, and in particular, in response to the problems and needs in the art that have not yet been fully solved by currently available storage media. Accordingly, the present invention has been developed to provide an apparatus, system, and method for accessing discontinuous media tracks that overcome many or all of the above-discussed shortcomings in the art.

The apparatus, in one embodiment, accesses discontinuous media tracks on a storage medium having more than one independently formed storage region thereon. Each storage region may include a set of track segments. In certain embodiments, a memory is provided to store offset information for each storage region. The offset information may correspond to one or more track segments. In one embodiment, each track is defined as a collection of closely aligned track segments that preferably includes one track from each storage region.

In one embodiment, the apparatus includes one or more stamped storage regions. The stamped storage regions may be formed from a master template patterned directly or indirectly by e-beam lithography. Consequently, selected media patterns may be formed for a small area, or storage region, and may be replicated to cover the surface of a storage medium, such as a disk.

The apparatus may be provided with a logic unit containing a tracking module configured to functionally execute the necessary steps of sensing a head position within a current storage region, accessing offset information, and aligning a storage head with a closely aligned track segment within a subsequent storage region. In a further embodiment, a mapping module may record head positioning and offset information and may create a table defining the location of one or more track segments within a storage region. The table may subsequently be stored in memory. In certain embodiments, the mapping module further calculates a physical offset between adjacent storage regions. Consequently, a storage device may access discontinuous media tracks by referencing offset information stored in memory.

A system of the present invention is also presented to access discontinuous media tracks. In particular, the system, in one embodiment, includes a storage device having a storage medium with independently formed storage regions and a storage access device such as a computer. Each storage region includes one or more track segments that may form part of a discontinuous track. The storage device may store offset information for each storage region. In one embodiment, offset information is stored for each track segment on the storage media. In addition, the storage device may sense a head position within a current storage region, access offset information, and align a storage head with a closely aligned track segment within a subsequent storage region. In certain embodiments, the storage device may collect offset information during a mapping process.

A method of the present invention is also presented for accessing discontinuous media tracks. The method in the disclosed embodiments substantially includes the steps necessary to carry out the functions presented above with respect to the operation of the described apparatus and system. In one embodiment, the method includes the steps of providing a storage medium with independently formed storage regions thereon, sensing a position of a head within a current storage region, accessing track offset information corresponding to a closely aligned track segment within a subsequent storage region, and adjusting a head position to align with the closely aligned track segment within the subsequent storage region.

In one embodiment, the subsequent storage region is a storage region adjacent to the current storage region. In an alternative embodiment, the subsequent storage region comprises a storage region nonadjacent to the current storage region. Thus, the head may align with a designated track segment in a contiguous or noncontiguous storage region. In one embodiment, a 2:1 interleave scheme is used to provide the head time to adjust to a track offset.

The method may further include mapping the storage medium to determine the location of the various track segments. In one embodiment, the mapping process is conducted during manufacture. Alternately, the mapping process may be conducted in response to a formatting operation. In one embodiment, mapping includes calculating a physical offset between adjacent storage regions. In certain embodiments, the positioning of the head and offset information may be recorded and may be stored in a non-volatile memory.

In a further embodiment, the method includes defining a track having a track segment from each storage region. The track segment may be a closely aligned track segment within a subsequent storage region. Accessing a track may include advancing from a current storage region to a nonadjacent storage region. Alternatively, the head may access a track by advancing from a current storage region to an adjacent storage region.

The method may further include creating a table defining the location of one or more track segments within a storage region. The table may subsequently be stored in a memory. As a result, track segments located on individually formed storage regions may be accessed by referencing offset information stored in the memory.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables a storage device to store and access data on a storage medium comprising more than one independently formed storage region such as a patterned media surface formed by inexact pattern replication. A tracking module enables accessing discontinuous media tracks comprising track segments from the various storage regions. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a graph illustrating one embodiment of mapping table in accordance with the present invention;

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
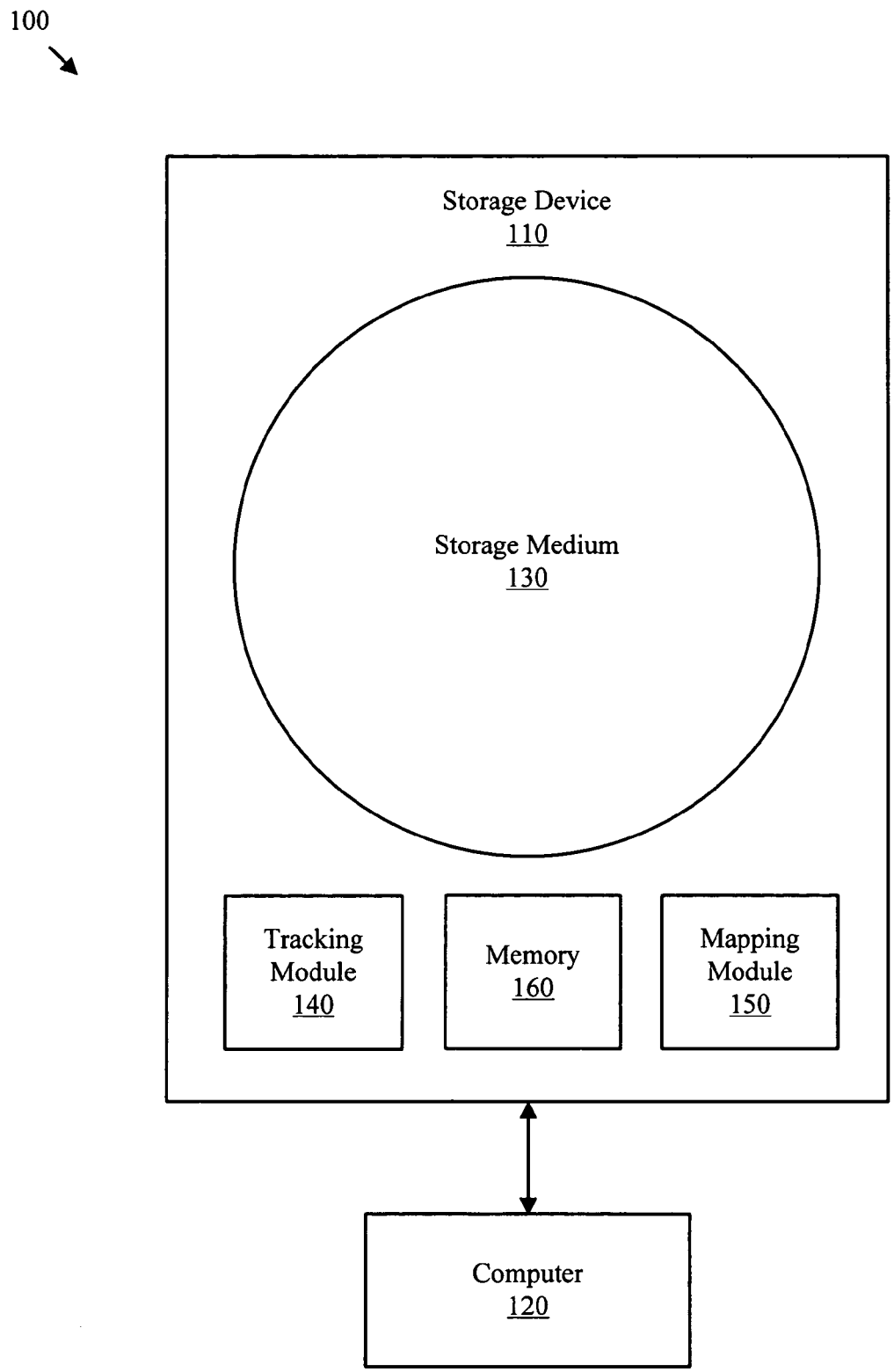
FIG. 1 is a schematic block diagram illustrating one embodiment of a system for accessing discontinuous media tracks of the present invention.

FIG. 1 depicts one embodiment of a discontinuous media track accessing system 100 of the present invention. The track accessing system 100, in the depicted embodiment, includes a storage device 110 and a storage access device such as a computer 120. As illustrated, the storage device 110 includes a storage medium 130, a tracking module 140, an optional mapping module 150, and a memory 160. The computer 120 accesses information stored on the storage medium 130. The tracking module 140, the mapping module 150, and the memory 160 facilitate locating track segments formed on the storage medium 130.

To provide high density storage, the storage medium 130 may include independently formed storage regions, resulting in discontinuous media tracks as discussed above. Forming storage regions independently may contribute to efficient, cost-effective production of high density storage media. The tracking module 140 senses the position of a read/write mechanism, such as a head, relative to the formed track segments on the storage medium 130. The tracking module may access offset information stored in the memory 160 in order to anticipate positioning relative to a subsequent track segment.

The mapping module 150 maps the surface of a storage medium 130, such as a disk, enabling the collection of offset information. The offset information may include information regarding the location of track segments and the physical offset of the formed storage regions. In one embodiment, the mapping module stores the information in the memory 160. Consequently, the tracking module 140 may reference stored offset information to position the head of the storage device 110.

In certain embodiments, the tracking module 140 and the mapping module 150 may be combined within the storage device 110. Alternatively, the mapping module 150 may be independent and may be located in a separate device.

Figure 2:
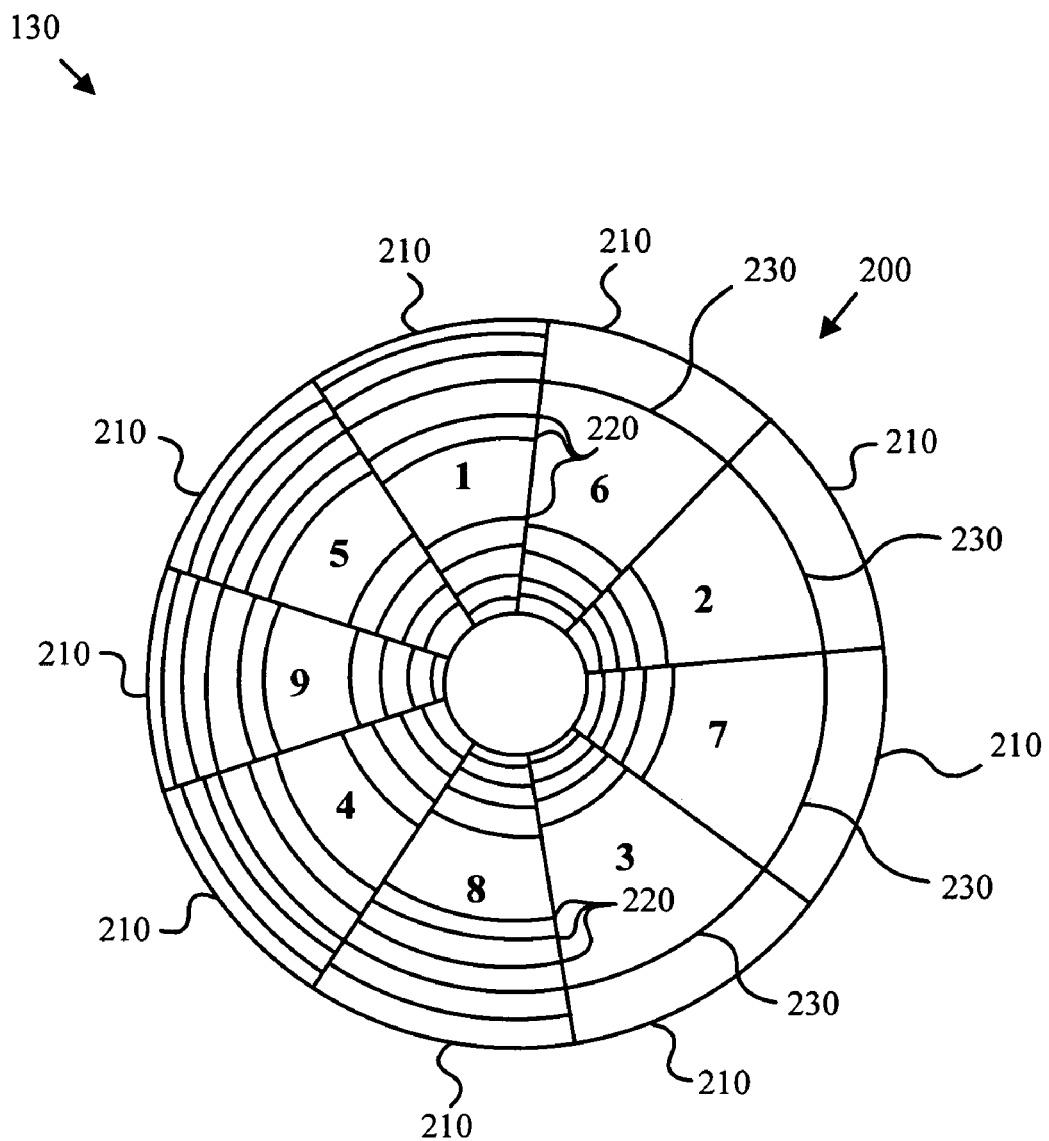
FIG. 2 is a top view schematic illustration of one embodiment of a storage medium of the present invention.

FIG. 2 illustrates in greater detail one embodiment of the storage medium 130 depicted in FIG. 1. In the depicted embodiment, the storage medium 130 is a disk 200 stamped to form multiple storage regions 210. Alternatively, the storage medium 130 may be any medium configured to store information in various independently formed storage regions 210.

Those of skill in the art will appreciate that the independently formed storage regions 210 may be formed by a variety of methods. In certain embodiments, a master template commonly known as a 'mother' or 'father' that corresponds to a single storage region 210 may be used to form a 'daughter' template comprising multiple storage regions 210. In one embodiment, the daughter template is used to stamp an entire disk 200 in a single operation. In another embodiment, the disk 200 is stamped multiple times by a single template.

A storage region 210 may include multiple track segments 220, which may be selected to form one or more tracks 230. In one embodiment, a track 230 includes a track segment 220 from each storage region 210. The track segments 220 selected to form a track 230 may be the closest or next to closest aligned track segments 220 within subsequent storage regions 210.

In certain embodiments, the storage regions 210 may be located contiguous to each other as depicted. Contiguous storage regions 210 enable the storage medium 130 to provide maximum storage density within a defined surface area, though storage regions 210 may be spaced by an unformed area or the like. The storage medium 130 may have storage regions 210 of varying size and number. Additionally, the formed storage regions 210 may alternate in size and type, and may not be uniform. The offset between storage regions 210 may correspond to one or more physical dimensions or directions. For instance, the offset may be radial, circumferential, rotational, horizontal, lateral, or the like.

Those of skill in the art will further recognize that patterned storage regions 210 may be formed using a variety of methods. For example, the storage regions 210 may be imprinted using techniques such as imprint lithography to form patterned track segments 220. Alternatively, a method such as shadow masking may be used. In other embodiments, multigrain media, single domain islands, or other forms of track segments 220 capable of storing data may be formed into storage regions 210 using alternative processes. Thus, the invention is not limited to the illustrated embodiments.

In a select embodiment, one or more storage regions 210 are stamped onto a substrate of a storage medium 130 by imprinting a resist layer with a master template patterned bye-beam lithography. The pattern may subsequently be etched into the surface of the substrate. Multiple storage regions 210 may be formed on the substrate simultaneously or individually.

In certain embodiments, the formed storage regions 210 have patterned features with dimensions ranging between about 15–30 nm. Dense media patterns with high resolution features enable storage of greater amounts of data in smaller areas. As mentioned, however, perfect alignment of track segments 220 in adjacent storage regions 210 is extremely difficult to achieve, particularly when dealing with nano-scale media patterns. In certain embodiments, however, storage regions 210 that are positioned close together and nearly aligned may contribute to greater areal densities. Furthermore, precise positioning of a read/write mechanism, such as a head of a disk drive, may be required in order to efficiently access data store on the storage medium 130. Additional tracking information and time to reposition the read/write mechanism over track segments 220 may compensate for disruptions caused by the offset of the storage regions 210.

Referring now to FIGS. 1 and 2, in order to access a discontinuous media track 230, the tracking module 140 may sense the position of a head relative to a centerline of a track segment 220 within a storage region 210. Offset information for each storage region 210 may be stored in the memory 160. As a result, the tracking module 140 may access the offset information in order to accurately position the head over the desired track segments 220 of the storage regions 210. In one embodiment, the offset information may be stored in a table defining the location of the track segments 220 within a storage region 210.

FIG. 3 illustrates one example of a mapping table 300 containing offset information for each track segment 220 of the various storage regions 210. The offset information may be determined by performing one or more procedures to determine the location of at least one track segments 220 within a storage region 210. In one embodiment, the location of a track segment 220 may be determined by locating a closely aligned track segment of a subsequent storage region 210. An offset defined by the relative location of the other track segment 220 may be recorded and used to access track segments 220. Those of skill in the art will recognize that alternative methods may be used to define and store offset information relative to the location of track segments 220. Thus, the present invention is not limited to the disclosed embodiments.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Additionally, the order in which a particular method occurs may or may not strictly adhere to the order of the corresponding steps shown.

Figure 4:
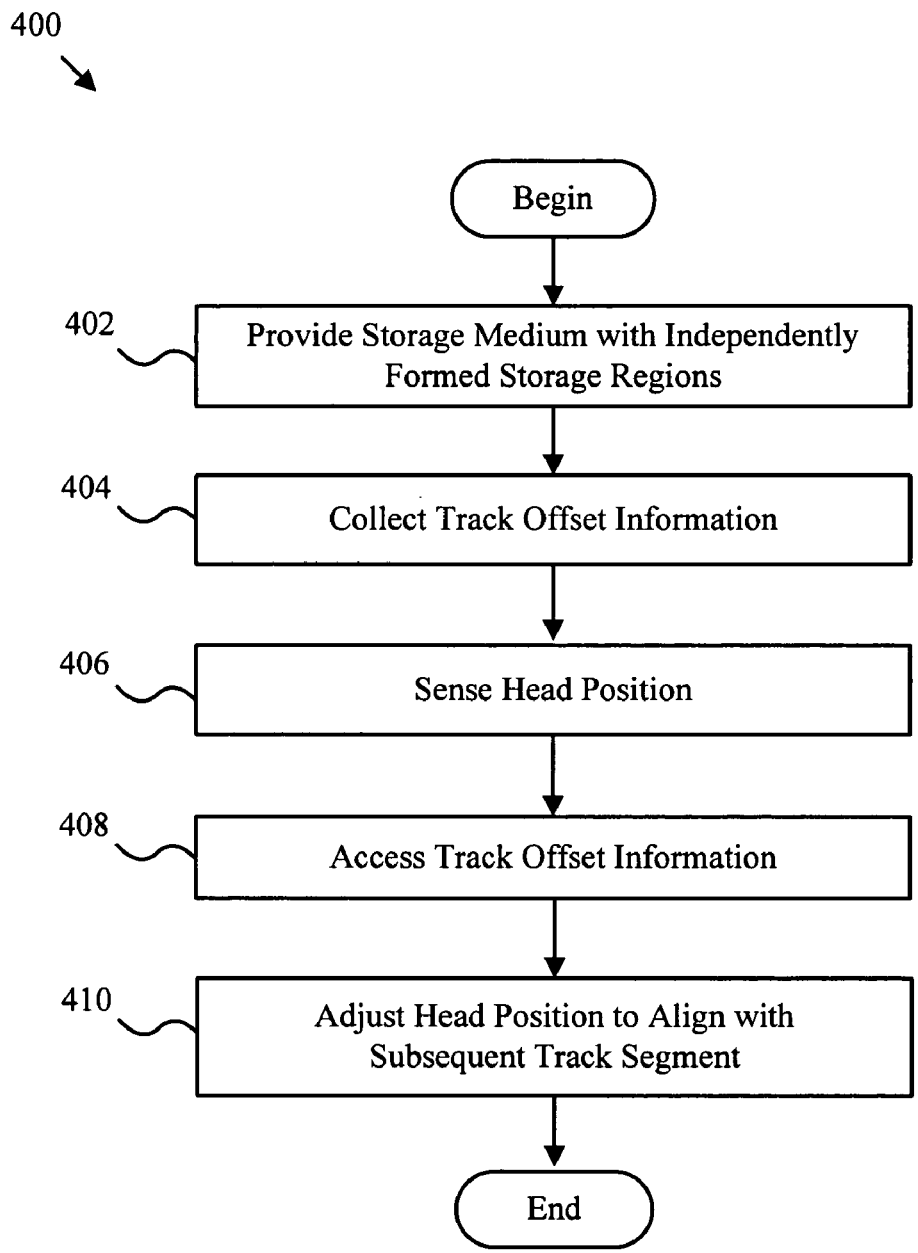
FIG. 4 is a schematic flow chart diagram illustrating one embodiment of a track access method of the present invention.

FIG. 4 illustrates one embodiment of an access method 400 of the present invention. As depicted, the access method 400 includes providing 402 a storage medium with independently formed storage regions 210, collecting 404 track offset information, sensing 406 a head position within a storage region 210, accessing 408 track offset information, and adjusting 410 the head position to align with the closely aligned track segment in another storage region 210.

The access method 400 for accessing discontinuous media tracks 230 enables manufacturer to more efficiently produce and access viable storage media 130 with greater storage densities. The access method 400 and table creation method 500 of FIG. 5 will be discussed with reference to the embodiments illustrated in FIGS. 1–3. Those of skill in the art, however, will recognize that the methods may be accomplished using a variety of embodiments and/or configurations and are not, therefore, limited to the depicted embodiments.

The access method 400 begins and a storage medium 130 with multiple independently formed storage regions 210 is provided 402. Because the storage regions 210 are formed independently, the track segments 220 of the storage regions 210 may be offset from adjoining storage regions 210. In order to properly position the head relative to the track segments 220, the physical offset between adjacent storage regions 210 is determined.

In one embodiment, the tracking module 140 senses and records head positioning. As the head senses track segments 220, track offset information may be determined and may be stored in memory 160. In certain embodiments, the mapping module 140 calculates a physical offset between adjacent storage regions. Subsequently, the determined track offset information may be used to collect 404 track offset information. In one embodiment, a table 300 of track offset information may be created and stored in memory 160. One embodiment of a method to create an offset information table 300 will be discussed in greater detail in relation to FIG. 5.

In a further embodiment, a track 230 may be defined. In certain embodiments, a media track 230 may include a track segment 220 from each storage region 210. Track segments 220 may include a defined centerline that is offset from the centerline of a track segment 220 from a different storage region 210. Hence a media track 230 may include track segments 220 from adjacent storage regions 210 that have centerlines that are closely aligned to the centerline of adjacent track segments 220. Alternatively, a media track 230 may include track segments 220 that are closely aligned on a nonadjacent storage region 210. In certain embodiments, the mapping module 150 and/or the tracking module 140 may define media tracks 230 from non-aligned storage regions 210.

A discontinuous media track 230 may be accessed using a variety of methods and configurations. In one embodiment, the storage medium 130 comprises nine adjacent storage regions 210, similarly formed and evenly distributed on the disk 200. The track 230 may subsequently be defined with a 2:1 interleave scheme, as illustrated in FIG. 2. Data stored on a complete track 230 may consequently be accessed in two revolutions of the disk 200. The use of intermediate storage regions 210 interspersed between consecutive storage regions 210 such as a 2:1 interleave scheme provide time and space to perform servo corrections and/or to locate a subsequent track segment 220. Thus, the allocation of intermediate storage regions enables the present invention to function effectively with discontinuous media such as patterned media formed by inexact pattern replication.

To determine head positioning, a storage device 110, or a tracking module 140, senses 406 the head of the storage device 110 relative to the centerline of a track segment 220 within a current storage region 210. Once the current position of the head is determined, track offset information may be accessed 408 to determine the physical adjustment necessary to position the head in a subsequent storage region 210.

In one embodiment, the head position is adjusted 410 to align with the closest aligned track segment 220 within another storage region 210. The tracking module 104 may access the stored track offset information in the memory 160 and may align the head in the subsequent storage region 210 relative to the determined track offset. Consequently, the access method 400 enables access of data stored in multiple storage regions 210 on a storage medium 130. The physical offset between the storage regions 210 may be determined and stored such that a head may be correctly positioned relative to a selected track segment 220 within a storage regions 210.

Figure 5:
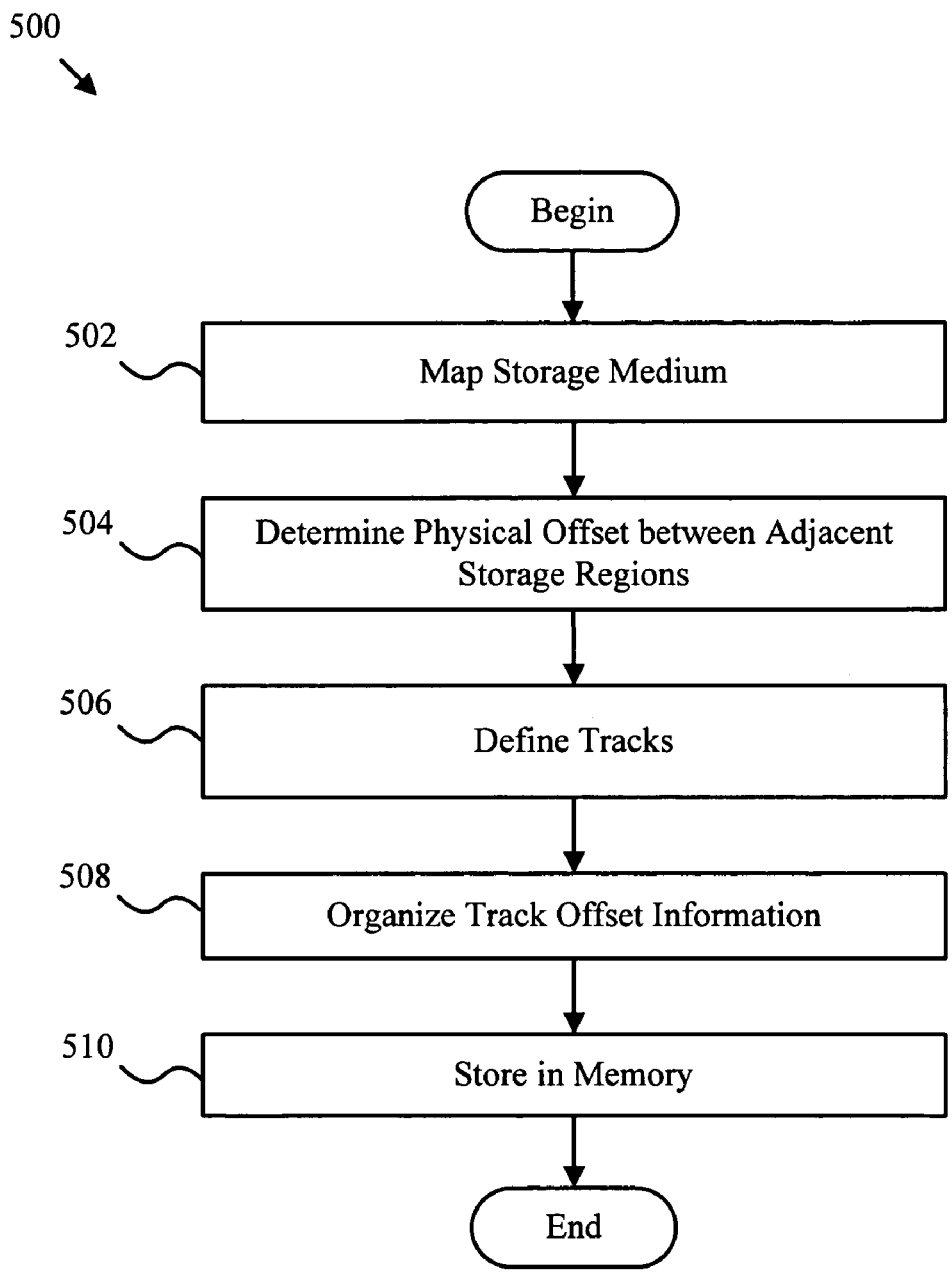
FIG. 5 is a schematic flow chart diagram illustrating one embodiment of a table creation method of the present invention.

FIG. 5 is a flow chart diagram illustrating one embodiment of a table creation method 500 of the present invention. The table creation method 500 may include mapping 502 a storage medium, determining 504 the physical offset between adjacent storage regions 210, defining 506 a track 230 having a track segment 220 from each storage region 210, organizing 508 track offset information in a table, and storing 510 the table in the memory 160. The table creation method 500 may correspond to step 404 for collecting offset information as discussed in relation to FIG. 4.

In one embodiment, the mapping module 140 maps 502 the storage medium 130 to determine the location of the track segments 220. The mapping module 140 may further determine 504 the physical offset between the storage regions 210. Alternatively, the tracking module 140 may locate one or more track segments 220 and may determine 504 the physical offset between adjacent storage regions 210. The tracking module 140 or the mapping module 150 may define 506 a media track 230 having a track segment 220 from each storage region 210.

In one embodiment, the tracking module 140 determines which track segments 220 most closely align with adjacent storage regions 210. Subsequently, the tracking module 140 may define a track 230 that may be accessed by a servo system. Hence, the storage regions 210 may be physically misaligned during production, yet a tracking module 140 may determine an accessible track 230 that may be used in a servo system.

The subsequent track offset information may be organized 508 into one or more tables, such as the mapping table 300 of FIG. 3, and the table may be stored in the memory 160. As a result, the tracking module 140 may access the table(s) stored in the memory to determine head positioning in order to access data stored on discontinuous data tracks 230.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for accessing discontinuous media tracks, the method comprising:
   providing a storage medium having a plurality of independently formed storage regions thereon, each storage region comprising a plurality of track segments;
   sensing a position of a head relative to a centerline of a track segment within a current storage region;
   accessing track offset information corresponding to a closely aligned track segment within a subsequent storage region, wherein the subsequent storage region comprises a storage region nonadjacent to the current storage region; and
   adjusting a head position to align with the closely aligned track segment within the subsequent storage region.

2. The method of claim 1, wherein the plurality of independently formed storage regions comprises at least one stamped region.

3. The method of claim 2, wherein the at least one stamped region is formed from a master template patterned by e-beam lithography.

4. The method of claim 1, wherein the plurality of independently formed storage regions are formed by a daughter template substantially corresponding to an entire media surface, the daughter template formed from a master template corresponding to a single storage region.

5. The method of claim 1, wherein the plurality of independently formed storage regions are accessed using a 2:1 interleaving scheme.

6. The method of claim 1, further comprising mapping the storage medium to determine the location of the plurality of track segments.

7. The method of claim 1, further comprising calculating a physical offset between adjacent storage regions.

8. The method of claim 1, further comprising defining a track comprising a track segment from each storage region.

9. The method of claim 8, wherein the track segment is a closely aligned track segment within a subsequent storage region.

10. The method of claim 8, wherein accessing a track comprises advancing from a current storage region to a nonadjacent storage region.

11. The method of claim 10, further comprising storing the table in a memory.

12. The method of claim 1, further comprising collecting offset information.

13. The method of claim 1, further comprising creating a table defining the location of at least one track segment within a storage region.

14. An apparatus for accessing discontinuous media tracks, the apparatus comprising:
   a storage medium having a plurality of independently formed storage regions thereon, each storage region comprising a plurality of track segments;
   a memory configured to store offset information for each storage region, the offset information corresponding to at least one track segment of the plurality of track segments;
   a tracking module configured to sense a position of a head relative to a centerline of a track segment within a current storage region; and
   the tracking module further configured to access the offset information and align a storage head with a closely aligned track segment within a subsequent storage region, wherein the subsequent storage region comprises a storage region nonadjacent to the current storage region.

15. The apparatus of claim 14, wherein the plurality of independently formed storage regions comprises at least one stamped region.

16. The apparatus of apparatus 15, wherein the at least one stamped region is formed from a master template patterned by e-beam lithography.

17. The apparatus of apparatus 15, wherein the at least one stamped region is formed from a daughter template substantially corresponding to an entire media surface, the daughter template formed from a master template corresponding to a single storage region.

18. The apparatus of claim 14, wherein the storage medium comprises a disk.

19. The apparatus of claim 14, further comprising a mapping module configured to collect the offset information.

20. The apparatus of claim 14, wherein the mapping module is further configured to defining a track comprising a track segment from each storage region.

21. The apparatus of claim 14, wherein the mapping module is further configured to create a table defining the location of at least one track segment within a storage region.

22. The apparatus of claim 14, wherein the mapping module is further configured to calculate a physical offset between adjacent storage regions.

23. A system for accessing discontinuous media tracks, the system comprising:
 a storage device comprising a storage medium having a plurality of independently formed storage regions thereon, each storage region comprising a plurality of track segments;
 the storage device further configured to store offset information for each storage region, the offset information corresponding to at least one track segment of the plurality of track segments;
 the storage device further configured to sense a head position relative to a centerline of a track segment within a current storage region;
 the storage device further configured to access offset information and align a storage head with a closely aligned track segment within a subsequent storage region, wherein the subsequent storage region comprises a storage region nonadjacent to the current storage region; and
 a storage access device configured to access the storage device.

24. The system of claim 23, wherein the storage medium comprises a disk.

25. The system of claim 23, wherein the plurality of independently formed storage regions comprises at least one stamped region.

26. The system of claim 25, wherein the at least one stamped region is formed from a master template patterned by e-beam lithography.

27. The system of claim 23, wherein the storage device is further configured to collect offset information.

28. The system of claim 23, wherein the storage device is further configured to define a track comprising a track segment from each storage region.

29. The system of claim 23, wherein the storage device is further configured to calculate the physical offset between adjacent storage regions.

30. The system of claim 23, wherein the storage device is further configured to create a table defining the location of at least one track segment within a storage region.

* * * * *

UNITED STATES PATENT AND TRADEMARK OFFICE
CERTIFICATE OF CORRECTION

| | | |
|---|---|---|
| PATENT NO. | : 7,046,476 B1 | Page 1 of 1 |
| APPLICATION NO. | : 11/032355 | |
| DATED | : May 16, 2006 | |
| INVENTOR(S) | : Thomas R. Albrecht et al. | |

It is certified that error appears in the above-identified patent and that said Letters Patent is hereby corrected as shown below:

Column 7,
Line 15, "bye-beam lithography" should read -- by e-beam lithography -- .

Signed and Sealed this

Twenty-sixth Day of December, 2006

JON W. DUDAS
*Director of the United States Patent and Trademark Office*